Patented Apr. 17, 1923.

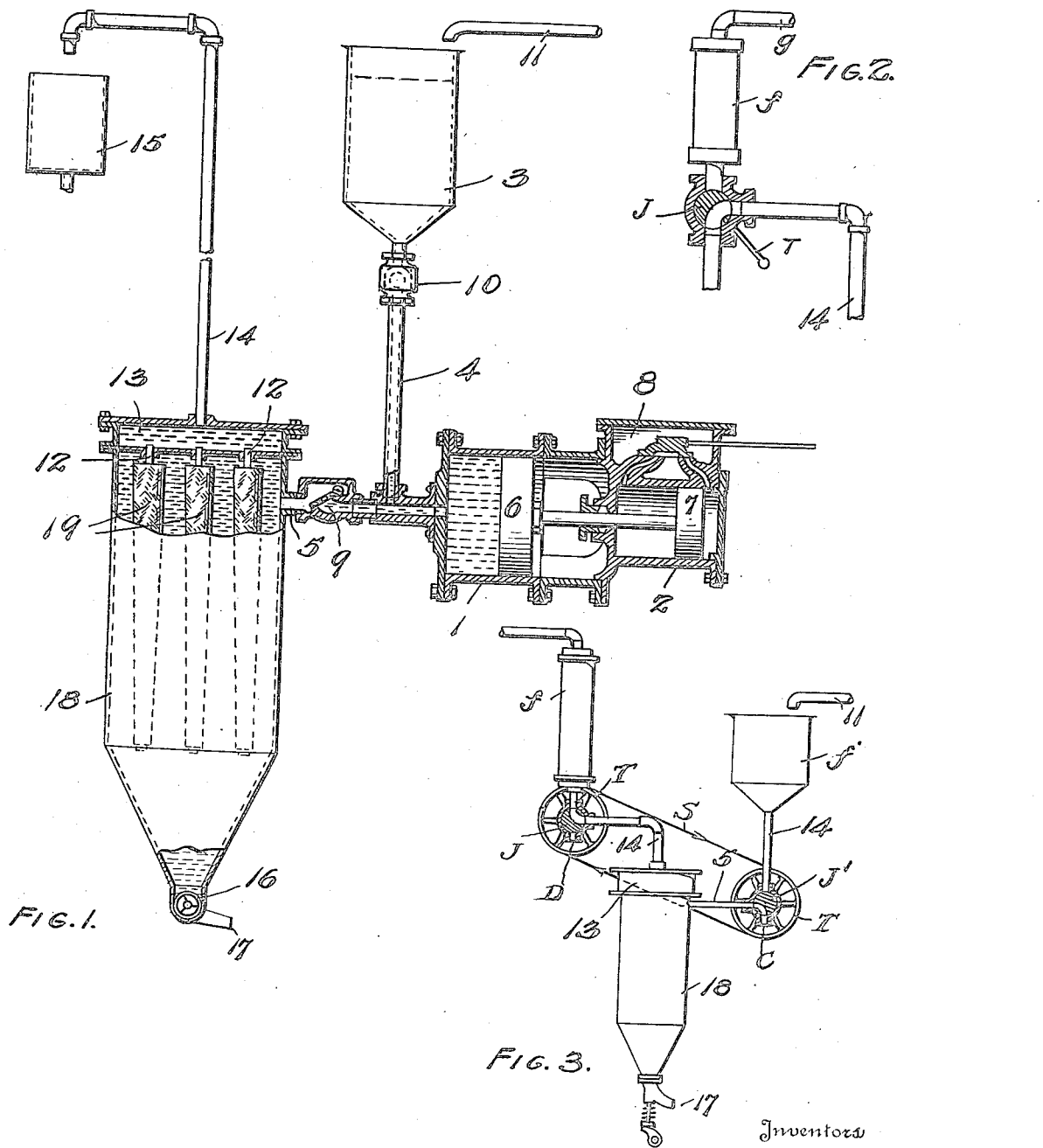

1,452,151

UNITED STATES PATENT OFFICE.

ALBERT LEGRAND GENTER AND GEORGE CAMBELL JONES, OF SALT LAKE CITY, UTAH, ASSIGNORS, BY DIRECT AND MESNE ASSIGNMENTS, OF ONE-HALF TO THE GENERAL ENGINEERING COMPANY, OF SALT LAKE CITY, UTAH, A CORPORATION OF UTAH, AND ONE-HALF TO ALBERT L. GENTER, OF SALT LAKE CITY, UTAH.

CONTINUOUS THICKENING PROCESS.

Application filed February 19, 1918. Serial No. 218,140.

To all whom it may concern:

Be it known that we, ALBERT L. GENTER and GEORGE C. JONES, citizens of the United States, residing at Salt Lake City, in the county of Salt Lake and State of Utah, have invented certain new and useful Improvements in Continuous Thickening Processes, of which the following is a specification.

Our invention relates to a process for the rapid separation of solids from clear liquids through a continuous filtration operation that delivers a continuous stream of clear filtrate while the mixture being filtered is gradually thickened into a thick pulp or paste which contains very little liquid. Such a process as just mentioned is disclosed in the prior patent to Genter, No. 1,214,152, dated January 30, 1917, wherein is disclosed a means of cleansing a filter medium in situ by directing in alternate succession the filter current against one side of the filter medium and a cleansing current against the opposite side of said medium. Although the process of cleansing the medium in situ is substantially the same, in our present invention, it is not necessary to produce this cleansing action in such rapid succession with the filtering action, nor is it always necessary to resort to an entirely automatic actuating mechanism so that the rhythmic pulsating action can be altered from a rapid to a slow action as desired.

In the prior patent, before mentioned, the rotation or shifting of the ported member or members connecting the filtrate at one time with the atmosphere and then with a back pressure means is mechanically performed through some outside mechanical energy such as a pulley, belt, and the like.

Our present invention combines this process of alternately directing the filter current against the one side of said medium and the back-pressure cake-discharging current against the opposite side of said medium, with a further simultaneous pressure releasing means in such a manner that the finest deposit of the solids on the filter medium can more easily be discharged from the medium while in situ.

Our experience in this line of research has developed the fact that if the cleansing action be carried on as described in the aforesaid Patent No. 1,214,152, the medium is not really cleansed until a cake of substantial thickness and body has been collected on the filter medium. This is due to the fact that during the back pressure pulsation, filtration pressure also exists within the filter chamber, thus preventing a thin cake from falling from the medium after the back-pressure has dislodged it from said medium, it being understood that the filter pressure is also present in the filter chamber and that it acts quickly when the back pressure is released and that a thin cake will thus be forced back upon the filter surface a number of times until it has accumulated to such an extent that its mass weight is greater than the filtration pressure. When the thickness or mass of the deposited solids is sufficiently great to overcome the filtration pressure referred to, the solids will fall from the filter medium.

The present invention has for an essential object the discharge of the finest kind of a deposit during each back pressure pulsation and although the invention may be carried out by means similar to those shown in the prior Patent. No. 1,214,152, before mentioned, it is not limited to such mechanism, but comprehends and includes any mechanical arrangement by which the desired result may be attained, and is to be limited only by the terms of the appended claims.

In the accompanying drawing forming a part of this specification, we have illustrated one embodiment of mechanism for performing the improved process, and wherein—

Fig. 1 illustrates a sectional view, partly in elevation, showing a filter chamber with a filtrate outlet and a controlling member of the inlet embodying the salient feature of the present invention.

Fig. 2 illustrates an additional back pressure means attached to the filtrate outlet.

Fig. 3 illustrates a further means of releasing the filtration pressure simultaneously with the cake-discharging back pressure.

Although we have illustrated these several means by which the present process may be carried out, it is to be understood that the invention we are about to describe is not restricted to such apparatus or to any particular type of apparatus, as we may resort to a variety of mechanical constructions and arrangements of parts in order to obtain the novel results which we will presently describe.

From the brief description heretofore given, it will be apparent that if the back-pressure cake-dislodging pulsation occurs in such a manner that the filtration pressure already existing within the filter chamber be released at the same time, there will be no resisting pressure to force the deposit of solids back upon the filter medium. In other words, as soon as the back pressure is released, this will permit the dislodged solids to drop from the medium and settle before they can be redeposited in cake form upon said medium by the following impulse of filtration pressure, and this very desirable object can be attained, as we have found in the operation of the present invention, by shifting the ported members disclosed in the prior Patent No. 1,214,152, to the feed side of the filter chamber, instead of keeping said ported members on the discharge side.

In the illustrated embodiment of mechanism capable of working the present process, one filter chamber of a simple and more or less well known form is disclosed, but it will be understood that a series of such chambers with their contained filter elements may be so connected to one or more actuating mechanisms that any desired capacity may result. It will also be understood that the filter chambers may be so connected that the discharge of the thickened material may be made from individual cells or chambers, if desired.

In the mechanism shown in Fig. 1, an actuating pressure chamber, 1, and a pressure energy source, 2, are suitably connected. 3 indicates a source of feed with connections 4 and 5; 6 and 7 are connected pistons operating in the pressure chamber, 1, and energy source, 2, which is provided with a controlling valve, 8. The supply connections, 4 and 5, are provided with check valves, 9 and 10, and the feed is supplied to the tank, 3, by a pipe, 11. The clear filtrate escapes from the filter elements through pipes, 12 and enters the filtrate chamber, 13, and thus escapes through a pipe, 14, for admission to a launder, 15. The filter chamber, 18, is provided with screw conveyer or scroll, 16, and spout or outlet, 17, and the filtrate pipes are provided with filter elements, 19, of any desired character.

In the apparatus shown in Fig. 1, the whole device is supposed to be full of the material to be filtered. The chamber, 2, and piston, 7, are nothing more than the steam engine which actuates the pressure piston, 6, in the chamber, 1, quite similar to the principle of all steam-actuated pumps. The supply tank, 3, is shown as located above the filter and pump, but this supply can be just as well located in any other position relative to the pump and filter. If the steam moves the pistons, 7 and 6, to the position shown in Fig. 1, a supply of material will flow from the tank, 3, through the check valve, 10, and the pipe, 4, into the chamber, 1, filling the same. Simultaneously with this action, the ported check-valve, 9, closes and permits a small supply of the excess unfiltered material in the filter chamber, 18, to flow into the chamber, 1. On the return stroke of the piston, 7, pressure is generated on the non-compressible liquid or material to be filtered contained in the pipes, 4, and 5, and the chambers, 1 and 18. As a consequence, the check-valve, 10, is closed by this action and the check-valve, 9, is opened. The continued piston action exerted through the steam or compressed air on the right of the piston, 7, forces the piston, 6, and the liquid in the chamber, 1, to the left, thus displacing the liquid in the chamber, 1, into the filter chamber, 18. The filtration pressure thus exerted has forced filtrate through the elements, 19, into the filtrate chamber, 13, and thence out the long filtrate pipe, 14, into the collecting launder, 15. As soon as the piston, 7, has completed its stroke, it is reversed by the automatic slide-valve mechanism, 8, common to all steam pumps, or if any other pressure means be used, it is reversed by any method common to all reciprocating motions. Upon the reversal of the piston, 7, the check-valve, 10, is opened through the suction action due to this reverse movement of the piston, 6, and at the same time the check-valve, 9, is closed. As this check-valve, 9, has a small port through which the filtration pressure existing in chamber, 18, can force a small amount of unfiltered liquid, it will be seen that during the reverse suction movement of the piston, 6, the filtration pressure existing in chamber, 18, subsides and the pressure of the filtrate contained in the filtrate pipe, 14, being greater than that existing within the chamber, 18, the back-pulsating cake-discharge pressure automatically results and results co-incident with the release of the filtration pressure in the chamber, 18. This subjects the filter elements 19 to a shock which causes their walls to be moved or shaken and dislodges any sediment collected upon the outer surfaces of the filter elements, 19, during the foregoing filtration period and these dislodged solids tend to settle to the bottom of the chamber, 18, where they are collected and drawn off by means of a conveyer or scroll, 16, and spout, 17, or by any other means. From the foregoing, it will be seen that if the reciprocating piston movement be maintained over any desired length of time, the action will be composed of a series of filtration impulses in one direction which will naturally be somewhat retarded, due to the filtration resistance, and a series of alternating cake-discharge back pulsations, co-incident with the relase of the filtration pressure. These back pressure pulsations will be of shorter duration, due to the fact that the return movement of the piston, 7, is practically under no load and will be quicker than is the movement causing filtration. Through this simple process, the feed side of the filter together with its energy source is made to cause the alternating pulsations or impulses resulting in filtration in one direction and back pressure of the filtrate column in the other direction, co-incident with the release of the filtration pressure, with its advantages already described. The thickened material is withdrawn from the bottom of the filter chamber as already indicated.

If any additional back pressure means is to be used, this may be attached to the filtrate column, 14, as shown in Fig. 2. This may be a rotating or sliding valve placed on the filtrate outlet pipe so that when in one position the filtrate passes out into the atmosphere and collecting launder, 15. When the pistons, 7 and 6, are reversed, this rotating or sliding valve is also reversed, connecting the filtrate in the pipe, 14, with a back pressure chamber, $f$, wherein is stored sufficient compressed air, steam, or other gas, or liquid under pressure. The rotating or sliding plug, J, shown in Fig. 2, is so timed by means of its switch, T, with the reversing mechanism attached to the steam cylinder, 2, and the steam chest, 8, that it is reversed simultaneously with the reversal of the steam or compressed air valve 8, thus causing an additional back pressure to be exerted on the filtrate column at the time the filtration pressure is released in the chamber, 18, and a back pressure pulsation occurs.

In Fig. 3, the same action is obtained by two rotating or sliding valves similar to those described in the prior Patent No. 1,214,152. This mechanical means does away with the reciprocating steam engine principle shown in Fig. 1, but effects exactly the same results. Filtration pressure is generated by the hydrostatic head or an additional pressure means exerted on a column of liquid in the reservoir, $f'$. In one position the rotating valve plug, J', permits the liquid under pressure to enter the filter chamber, 18, thus forcing the filtrate out through the pipe, 14, and open position of the rotating plug, J. As both plugs are connected by means of pulleys or gears, T, and belt or chain, S, they will rotate in perfect unison. As soon as the plug, J, reaches the position where the pipe, 14, is connected to the back pressure means, $f$, by means of the port in the plug, J, the port in the plug, J', is in such a position as to connect to the atmosphere through the open side of the valve casing C. This open position releases the filtration pressure within the chamber, 18, so that the back pressure exerted through the port in the plug, J, from the pressure chamber, $f$, causes the deposited solids to be dislodged from the filter medium, as already described.

It is obvious from the foregoing that any number of sliding or rotating valve or reciprocating piston mechanisms can be resorted to in order to effect the alternating of the filter current against one side of the filter medium and the cleansing filtrate current against the opposite side of said medium simultaneous with the release of the filtration pressure.

It will also be noticed that simultaneous with the switching or reversing of the filtration pressure, the back pressure on the filtrate column is released.

Having thus described our invention what we claim as new and desire to secure by Letters Patent is:—

1. The process of filtering and thickening the mixture being filtered within a container with which the mixture to be filtered and the filtrate are continuously in contact with opposite sides of the filter medium, consisting in subjecting the mixture to be filtered to positive pressure which acts against one side of the filter medium intermittently, and, in alternation therewith, permitting the hydrostatic back pressure of the filtrate to exert the cleansing action against the other side of the filter medium by relieving the pressure on the unfiltered mixture.

2. The process substantially as herein described of continuously filtering and thickening the mixture being filtered under positive pressure, said process consisting essentially, in submerging the filter medium in the mixture to be filtered and imparting a positive rhythmical movement to the liquid on both sides of the filter medium by the application of positive pressure to the mixture to be filtered intermittently, and, in alternation therewith, permitting the hydrostatic back pressure of the filtrate to exert a cleansing action against the other side of the filter medium by relieving the pressure on the unfiltered mixture.

3. The process substantially as herein described of continuously filtering and thickening the mixture being filtered under positive pressure, said process consisting essentially in submerging the filter medium in a mixture to be filtered and imparting a positive rhythmical movement to the liquid on both sides of the filter medium by the application of positive pressure to the mixture to be filtered and release of same alternately, the relief of the filtration pressure on the unfiltered mixture being accompanied by substantially simultaneous positive action of the hydrostatic filtrate pressure on the opposite side of the medium.

4. The process of filtering within a container in which the mixture to be filtered and the filtrate are continuously in contact with opposite sides of the filter medium, consisting in intermittently applying and relieving the pressure of the mixture to be filtered against one side of the filter medium and utilizing back pressure on the filtrate against the other side of the filter medium during the periods of relief of the pressure of the mixture to dislodge the material collected upon the filter medium.

5. The process of filtering within a container in which the mixture to be filtered and the filtrate are continuously in contact with opposite sides of the filter medium, consisting in subjecting the mixture to be filtered to impulses of pressure against one side of the filter medium, subjecting the filtrate to pressure against the other side of the filter medium to dislodge the material collected upon the filter medium, and relieving the pressure of the mixture being filtered upon its side of the filter medium during the periods of dislodging the collected material by the back pressure of the filtrate.

In testimony whereof we affix our signatures.

ALBERT LEGRAND GENTER.
GEORGE CAMBELL JONES.